(12) United States Patent
Hayasaki et al.

(10) Patent No.: US 9,154,043 B2
(45) Date of Patent: Oct. 6, 2015

(54) POWER SOURCE DEVICE AND IMAGE FORMING APPARATUS

(71) Applicant: CANON KABUSHIKI KAISHA, Tokyo (JP)

(72) Inventors: Minoru Hayasaki, Mishima (JP); Hiroshi Mano, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 13/649,817

(22) Filed: Oct. 11, 2012

(65) Prior Publication Data

US 2013/0100712 A1    Apr. 25, 2013

(30) Foreign Application Priority Data

Oct. 20, 2011    (JP) .................................. 2011-231004

(51) Int. Cl.
    *H02M 3/24*    (2006.01)
    *H02M 3/335*    (2006.01)

(52) U.S. Cl.
    CPC ........ *H02M 3/33592* (2013.01); *Y02B 70/1475* (2013.01)

(58) Field of Classification Search
    CPC .... H02M 3/33515; H02M 1/36; H02M 3/156
    USPC ......... 363/17–20, 21.07, 21.08, 21.12–21.15, 363/65, 98; 399/88, 89, 301; 323/282–288
    See application file for complete search history.

(56) References Cited

U.S. PATENT DOCUMENTS

| | | | | |
|---|---|---|---|---|
| 4,777,575 A | * | 10/1988 | Yamato et al. | 363/21.1 |
| 5,654,611 A | * | 8/1997 | Yamamoto et al. | 315/308 |
| 5,995,397 A | * | 11/1999 | Kim | 363/97 |
| 6,348,780 B1 | * | 2/2002 | Grant | 323/222 |
| 7,869,231 B2 | * | 1/2011 | Cohen | 363/21.14 |
| 8,059,429 B2 | * | 11/2011 | Huynh | 363/18 |
| 8,451,628 B2 | * | 5/2013 | Strzalkowski | 363/21.01 |
| 2011/0267842 A1 | | 11/2011 | Archer | |

FOREIGN PATENT DOCUMENTS

| | | |
|---|---|---|
| CN | 1965466 A | 5/2007 |
| CN | 102104338 A | 6/2011 |
| JP | 4158054 B2 | 10/2008 |
| JP | 4210868 B2 | 1/2009 |

* cited by examiner

*Primary Examiner* — Rajnikant Patel
(74) *Attorney, Agent, or Firm* — Canon USA, Inc. IP Division

(57) ABSTRACT

A power source device that outputs a DC voltage includes a rectification unit configured to rectify an input pulse voltage, a voltage-current conversion unit disposed on a side where the pulse voltage is input into the rectification unit, a current-voltage conversion unit configured to convert a current from the voltage-current conversion unit into a voltage, and a comparison unit configured to compare the voltage from the current-voltage conversion unit with a reference voltage. An operation of the rectification unit is controlled based on an output from the comparison unit.

10 Claims, 13 Drawing Sheets

POWER SOURCE DEVICE AND IMAGE FORMING APPARATUS

BACKGROUND OF THE INVENTION

1. Field of the Invention

One disclosed aspect of the embodiments relates to a switching power source device based on a synchronous rectification method.

2. Description of the Related Art

As an example of a conventional switching power source, a configuration using a comparator illustrated in FIG. 10 is known. The switching power source illustrated in FIG. 10 detects voltages at both ends of a switching element field effect transistor (FET) for synchronous rectification by using the comparator to drive the FET. In FIG. 10, the switching power source includes a transformer 1001, a DC power source 1002, an FET 1003 on a primary side (metal-oxide semiconductor FET: MOSFET), an electrolytic capacitor 1004 on a secondary side, a load 1005, a circuit 1006 for controlling a switching operation, an FET 1007 for synchronous rectification, and a comparator 1008.

After the FET 1003 on the primary side is turned ON to store energy in the transformer 1001, when the FET 1003 is turned OFF, a source voltage of the FET 1007 for synchronous rectification rises, causing a voltage of a + terminal of the comparator 1008 to be higher than that of a − terminal. Accordingly, the FET 1007 for synchronous rectification is turned ON. Then, current flows to be 0 ampere (A). When the current starts to flow from the + terminal of the capacitor 1004 through the transformer 1001, a voltage at the − input terminal of the FET 1007 for synchronous rectification becomes higher than that at the + input terminal. Then, a gate voltage of the FET 1007 for synchronous rectification drops to turn OFF the FET 1007 for synchronous rectification.

Such a configuration and an operation enable control of the FET for synchronous rectification with a small number of components. FIG. 11 illustrates, as a similar circuit configuration, an example where a comparator includes a discrete circuit having a PNP transistor and a NPN transistor. Even in the circuit illustrated in FIG. 11, an operation similar to that illustrated in FIG. 10 may be performed.

As the synchronous rectification method, there is also a method that does not directly detect a current. As an example of such a method, use of ET products of transformers is discussed in Japanese Patent Nos. 4158054 and 4210868. FIG. 12 illustrates such an example of a synchronous rectification circuit. In FIG. 12, the synchronous rectification circuit includes a transformer 1201, a power source 1202, an FET 1203 on a primary side, an FET 1204 for synchronous rectification, an electrolytic capacitor 1205 on a secondary side, a load 1206, a first constant current source 1207, a capacitor 1208, a second constant current source 1209, a reference voltage 1210, a comparator 1211, resistances 1212 and 1213, a voltage detection circuit 1214, and a constant voltage source 1215.

The first constant current source 1207 generates current proportional to a voltage of the transformer 1201 during an ON-period of the FET 1203 on the primary side, and stores a time product (integrated value of the voltage during the ON-period) of the voltage generated at the transformer 1201 as a voltage of the capacitor during the ON-period of the FET 1203 on the primary side. The second constant current source 1209 generates current proportional to a voltage generated during an OFF-period of the FET 1203 on the primary side, and is turned ON to discharge the voltage in the capacitor 1208 when the FET 1203 on the primary side is turned OFF.

When the voltage of the capacitor 1208 drops to a predetermined value set based on the reference voltage 1210, the comparator 1211 operates to reverse a logical circuit, and the FET 1204 for synchronous rectification is turned OFF.

As other methods, there are a method where the configuration illustrated in FIG. 10 further includes a reference voltage source disposed in series to the input terminal of the comparator, and a method where a plurality of reference voltages is set as a threshold value, and hysteresis characteristics are given to prevent erroneous operations.

However, in the above configuration of the conventional switching power source illustrated in FIG. 10, in the case of an element where ON-resistance of the FET for synchronous rectification is low and a voltage between a drain and a source thereof is low, a problem of an incorrect operation occurs.

Especially, during light-load running (also referred to as critical mode or discontinuous mode) of the switching power source, the current flowing through the FET for synchronous rectification roughly drops to 0 A. In other words, since the voltage between the drain and the source of the FET for synchronous rectification also drops to about 0 A, when the element of low ON-resistance is used as the FET for synchronous rectification, it is difficult to detect the current. This problem may be solved by using an element of high ON-resistance. However, when the element of a high ON-resistance is employed, efficiency during a synchronous rectification operation is reduced.

On the other hand, the methods discussed in Japanese Patent Nos. 4158054 and 4210868, which do not directly detect the current, do not depend on ON-resistance of the FET. These methods are advantageous in that erroneous operations are limited because of the voltage integration, and a circuit configuration is simple. However, it is difficult to set a threshold value for determining timing to match OFF-timing of the FET for synchronous rectification with 0 A. It is because in setting the threshold value, when output voltage fluctuation or load fluctuation is large, for example, at the time of turning ON power, an average value that is a center value of charging and discharging of the capacitor fluctuates, and thus the OFF-timing of the FET for synchronous rectification may not match the timing of the current 0 A.

In the case of the methods discussed in Japanese Patent Nos. 4158054 and 4210868, since no current is directly detected, the circuit operates based on prediction and presumption. Accordingly, the FET for synchronous rectification must be turned OFF early to provide a certain margin. When the FET for synchronous rectification is turned OFF providing the margin, a conduction period of a body diode of the FET for synchronous rectification is extended, which consequently reduces efficiency.

SUMMARY OF THE INVENTION

One disclosed aspect of the embodiments is directed to a switching power source based on a synchronous rectification method that may correctly operate using a switching element of low ON-resistance without reducing efficiency.

According to an aspect of the embodiments, a power source device that outputs a DC voltage includes a rectification unit configured to rectify an input pulse voltage, a voltage-current conversion unit disposed on a side where the pulse voltage is input into the rectification unit, a current-voltage conversion unit configured to convert a current from the voltage current conversion unit into a voltage, and a comparison unit configured to compare the voltage from the current-voltage conversion unit with a reference voltage, wherein the comparison unit includes two switching portion.

An operation of the rectification unit is controlled based on output from the comparison unit.

According to another aspect of the embodiments, an image forming apparatus includes an image forming unit configured to form an image on a recording material, a control unit configured to control an operation of the image forming unit, and a power source configured to supply a DC voltage to the control unit. The power source includes a rectification unit configured to rectify an input pulse voltage, a voltage-current conversion unit disposed on a side where the pulse voltage is into the rectification unit, a current-voltage conversion unit configured to convert a current from the voltage-current conversion unit into a voltage, and a comparison unit configured to compare the voltage from the current-voltage conversion unit with a reference voltage, wherein the comparison unit includes two switching portion, and an operation of the rectification unit is controlled based on an output from the comparison unit.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings. The following embodiments are only examples and a technology scope of the disclosure is not limited to them.
One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1:
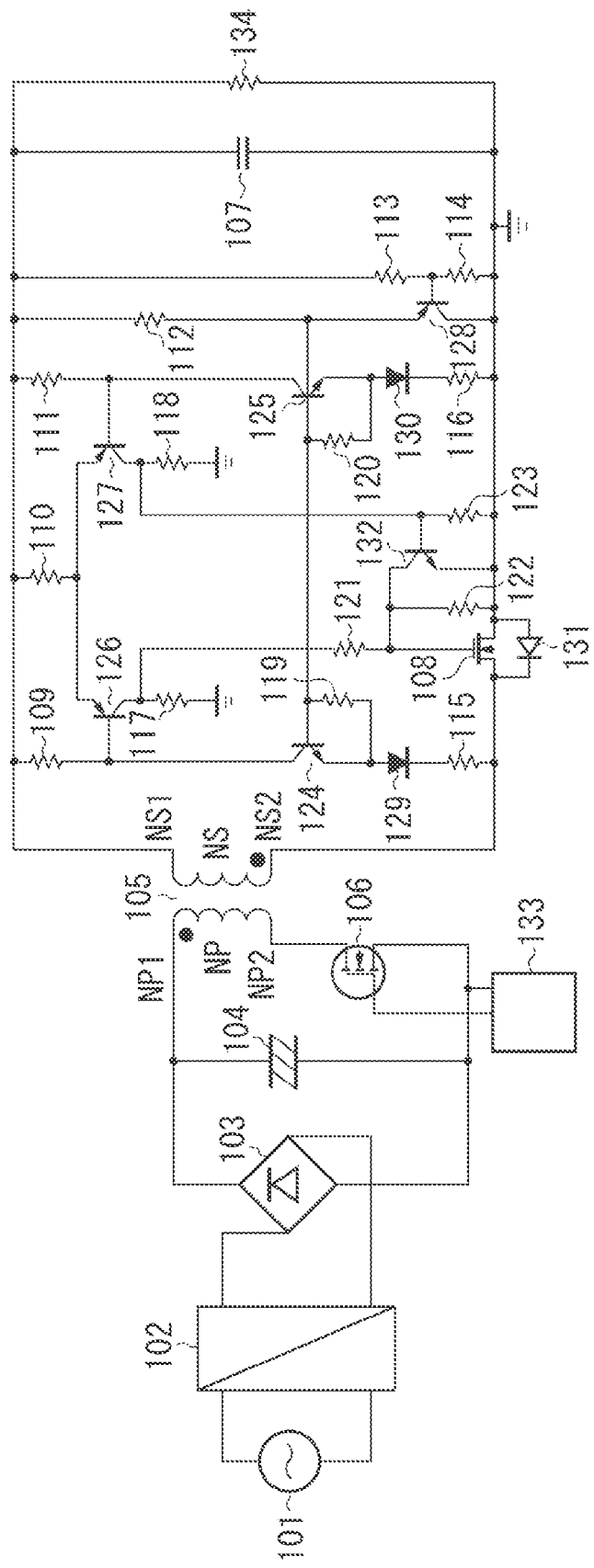
FIG. 1 is a circuit diagram illustrating a switching power source according to a first exemplary embodiment.

FIG. 1 is a circuit diagram illustrating a switching power source according to a first exemplary embodiment. FIG. 1 illustrates a connected state of a commercial AC power source 101 to an outlet. This switching power source includes a filter circuit 102 configured to remove noise, a rectification bridge circuit 103, an electrolytic capacitor 104 of a primary side (hereinafter, referred to as a primary electrolytic capacitor), a transformer 105, a switching element 106 of a primary side (hereinafter, referred to as a primary switching element). A terminal Np1 of a primary winding wire Np of the transformer 105 is connected to a + terminal of the primary electrolytic capacitor 104, and a terminal Np2 is connected to a drain terminal of the primary switching element 106.

When a voltage is applied in a direction where a secondary winding wire of the transformer 105 is Ns, and the terminals Np1 and Np2 of the primary winding wire are respectively + (positive) and − (negative) to supply current, in the secondary winding wire Ns, a positive voltage appears at a terminal Ns2, and a negative voltage appears at terminal Ns1. The terminal Ns1 of the secondary winding wire Ns is connected to a + terminal of an electrolytic capacitor 107 on a secondary side (hereinafter, referred to as a secondary electrolytic capacitor 107). In the present exemplary embodiment, for a switching element 108 for synchronous rectification (hereinafter, referred to as a synchronous rectification FET), an N channel FET is used.

A source terminal of the synchronous rectification FET 108 is connected to a − terminal of the secondary electrolytic capacitor 107, and a drain terminal is connected to the terminal Ns2 of the secondary winding wire Ns. The switching power source further includes resistances 109, 110, 111, 112, 113, 114, 115, 116, 117, 118, 119, 120, 121, 122, and 123, NPN transistors 124 and 125, and PNP transistors 126, 127, and 128, diodes 129 and 130, and a diode 131 which is included in the synchronous rectification FET 108 or externally attached (body diode).

Figure 2:
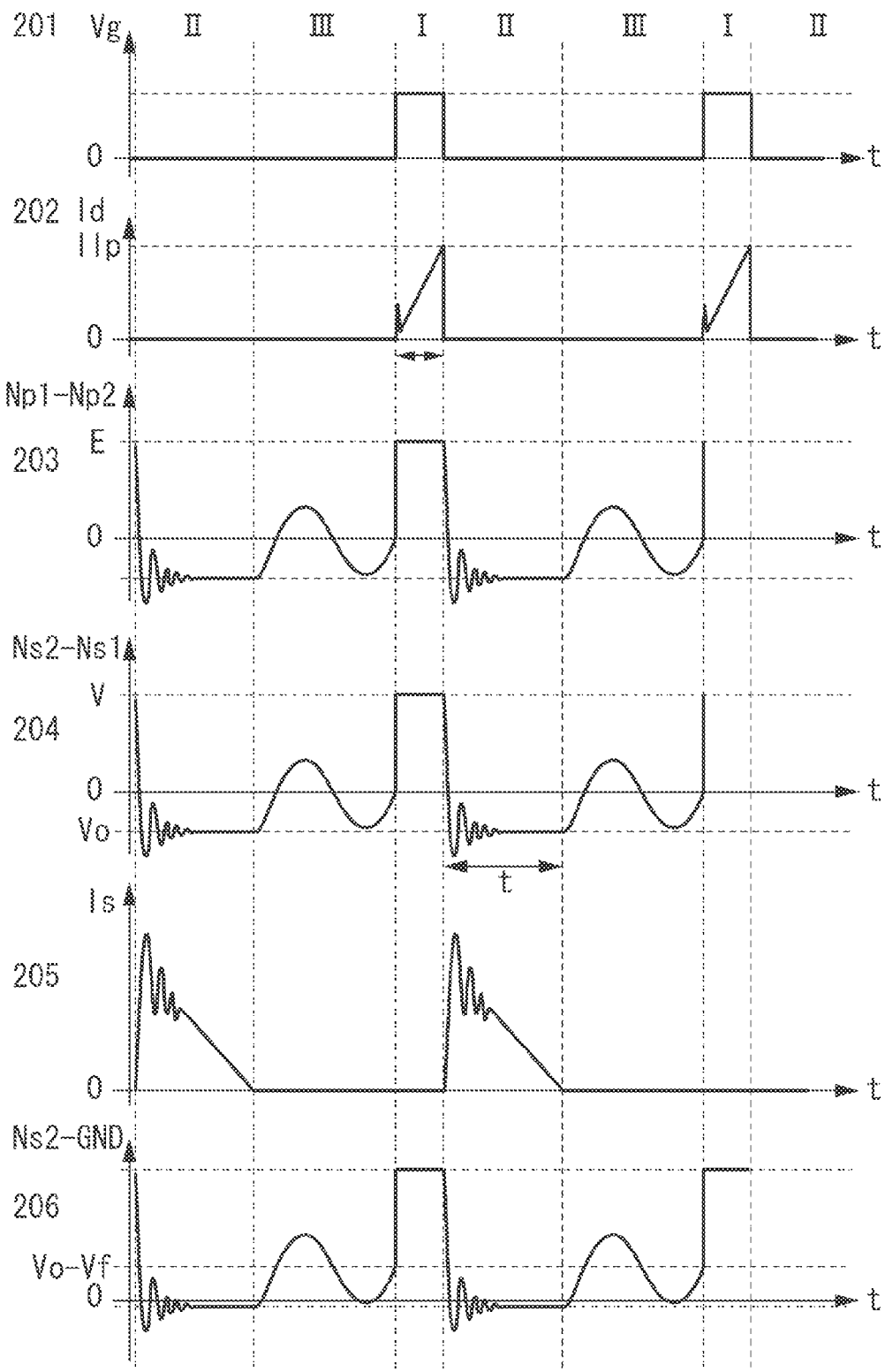
FIG. 2 illustrates an operation waveform of the switching power source according to the first exemplary embodiment.
Figure 3:
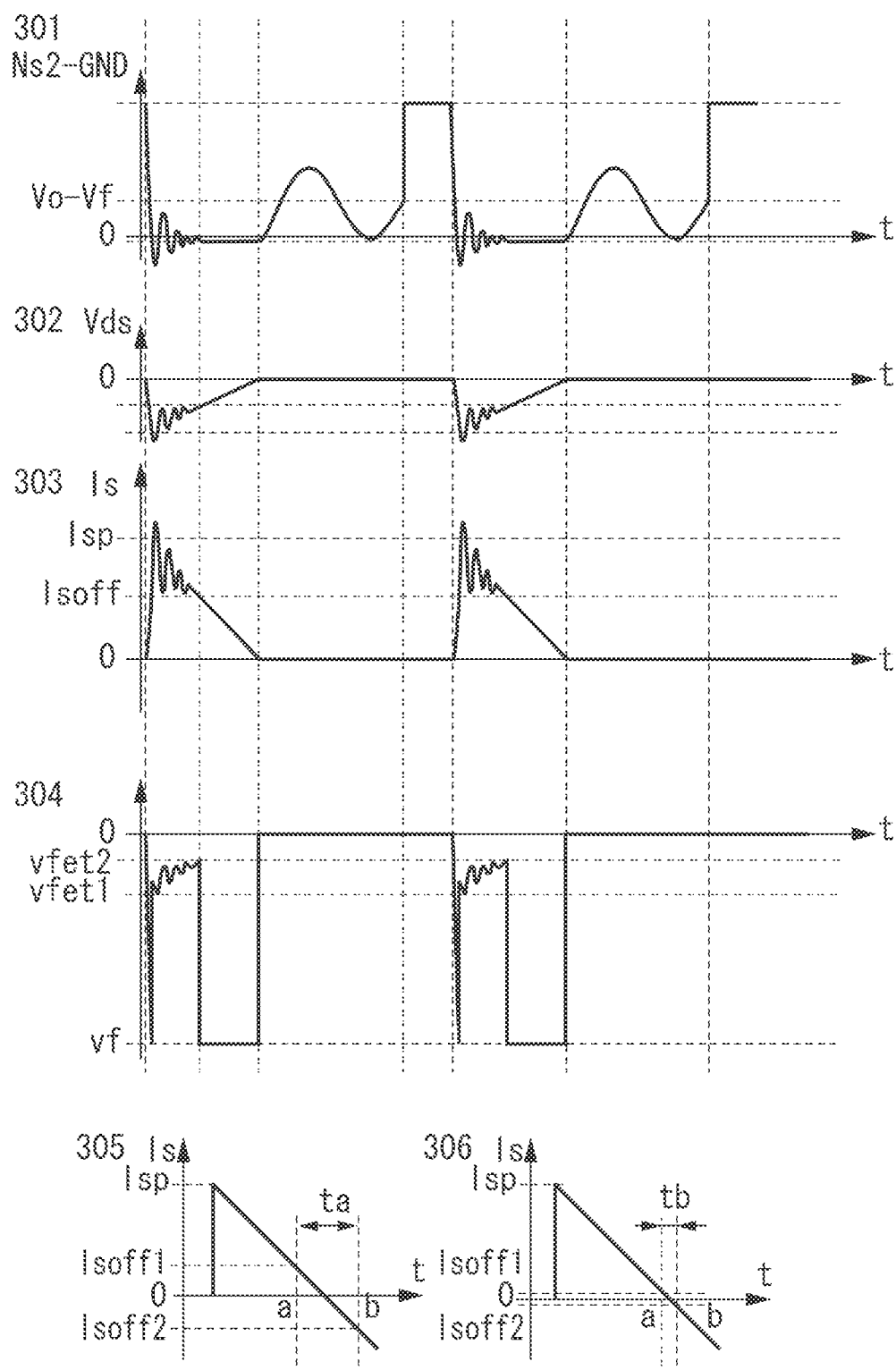
FIG. 3 illustrates an operation waveform of the switching power source according to the first exemplary embodiment.

Referring to FIGS. 2 and 3, an operation of the switching power source illustrated in FIG. 1 will be described. Operations of a switching control circuit for controlling the primary switching element 106 (in the present exemplary embodiment, MOSFET is employed: hereinafter, referred to as a primary FET 106) and a feedback circuit are known, and thus description thereof will be omitted.

When the primary FET 106 is turned ON to apply a voltage to the primary winding wire Np of the transformer 105, current starts to flow in a direction from the + terminal of the primary electrolytic capacitor 104 to the primary winding wire Np of the transformer 105 and from the drain of the primary FET 106 to the source. FIG. 2 illustrates a voltage waveform 201 between the gate and the source of the primary FET 106 and a drain current Id in a voltage waveform 202 of the primary FET 106. An ON-period of the primary FET 106 is a period I. During the period I, a voltage having a waveform 203 illustrated in FIG. 2 is applied to the primary winding wire Np of the transformer 105. In other words, a voltage of the primary electrolytic capacitor is applied in a direction where the terminal NP1 is on a high potential side. The waveform 203 illustrated in FIG. 2 indicates a voltage appearing at the primary winding wire Np, namely, Np1−Np2.

During the period I illustrated in FIG. 2, the current flowing through the primary winding wire Np of the transformer 105 increases with time. A current I1 of the primary winding wire Np is represented by I1P=E×t on/Lp, where Lp is inductance of the primary winding wire Np and t on is time that has passed from turning-ON of the primary FET 106. In this case, energy stored in the transformer is represented by 1/2×Lp× I1$p\hat{\ }$2.

A voltage V is generated at the secondary winding wire Ns of the transformer so that a voltage may be higher at the terminal Ns2 than that at the terminal Ns1. A potential difference generated at a waveform 204 illustrated in FIG. 2 and the secondary winding wire Ns is represented by V=E×n2/n1, where n1 is the number of turns for the primary winding wire, n2 is the number of turns for the secondary winding wire, and E is a voltage applied to the primary wining wire Np. This voltage is cut off by the body diode 131 of the synchronous rectification FET 108, and a schottky diode. Thus, no current flows through the secondary winding wire Ns to charge the secondary electrolytic capacitor 107. FIG. 2 illustrates current flowing through the secondary winding wire Ns in a waveform 205.

When the primary FET 106 is turned OFF, the energy stored in the transformer 105 is discharged through the secondary winding wire Ns. A period II illustrated in FIG. 2 is a period where the primary FET 106 is turned OFF to discharge the energy of the transformer 105 to the secondary side. Thus, during the period II, at the secondary wire Ns, a voltage reverse (reverse polarity) to that when the primary FET 106 is ON is generated. In other words, a voltage is higher at the terminal Ns1 than at the terminal Ns2. Then, a forward voltage is applied to the schottky diode 128 and the body diode 131 of the synchronous rectification FET 108 to set the diodes conductive. Accordingly, current flows through the secondary winding wire Ns to charge the secondary electrolytic capacitor 107. A cathode terminal of the diode 129 is connected to the drain terminal of the synchronous rectification FET 108, and a cathode terminal of the diode 130 is connected to the source terminal of the synchronous rectification FET 108.

A constant current source circuit including a resistance 115 and a transistor 124 is connected to the diode 129, and a constant current source circuit including a resistance 116 and a transistor 125 is connected to the diode 130. The two constant current source circuits respectively supply currents determined by a constant voltage circuit including resistances 112, 113, and 114 and a transistor 121, and by cathode voltages of the diodes 129 and 130. The currents are respectively converted into voltages again by resistances 109 and 111.

When current is generated to flow from the source to the drain at the synchronous rectification FET 108 to set a drain voltage lower than a source voltage, an anode voltage of the diode 129 becomes lower than that of the diode 130. The transistor 124 and the transistor 125 having their base terminals connected to each other are connected to an emitter terminal of the transistor 128. The transistor 128 constitutes a constant voltage circuit with the resistances 112 to 114. Accordingly, emitter voltages of the transistor 124 and the transistor 125 are roughly equal. Thus, voltages at both ends of the resistance 115 are higher than those at both ends of the resistance 116. As a result, current flowing through the resistance 115 becomes higher than that flowing through the resistance 116.

Thus, collector current of the transistor 124 becomes larger than that of the transistor 125. The collector currents are respectively converted into voltages by the resistances 109 and 111 to lower a base voltage of the transistor 126. Accordingly, the reduction of the voltage of the transistor 126 is larger than that of the voltage of the transistor 127, and a conductive state is generated between the collector and the emitter of the transistor 126 while a nonconductive state is generated between the collector and the emitter of the transistor 127. Thus, the transistors 124 and 125 are set to a base ground to enable high-speed response to a change of current. The transistors 124 and 125 share the base terminal, and the transistors having high pairing characteristics are used, thereby enabling highly accurate detection of a potential difference.

The synchronous rectification FET 108 must be turned OFF when the current flowing through the synchronous rectification FET 108 is 0 (A). Accordingly, a circuit is configured such that when a voltage between the drain and the source of the synchronous rectification FET 108 is several mV or lower, turning-ON and turning-OFF of the transistor 126 and the transistor 127 are reversed. During a conductive period of the schottky diode 131 (which may also be a body diode) attached outside the synchronous rectification FET 108, a potential difference (several 100 mV or higher) is much larger than a threshold value. Thus, when the diode 131 becomes conductive, a base potential of the transistor 126 is lowered, and a base current of the transistor 126 becomes sufficient to turn the transistor 126 ON to drive the synchronous rectification FET 108.

An output of the collector terminal of the transistor 126 is connected to the gate terminal of the synchronous rectification FET 108 via the resistance 121. When connected in this way, the voltage reduction of the diode 131 is caused by a charge current flowing through the secondary side of the transformer 105, so that the connection enables turning-ON of the synchronous rectification FET 108 by delay time (60 ns to 200 ns) of one transistor circuit amount. This achieves a speed higher than a circuit delay (400 to 700 ns) by, for example, a general-purpose comparator.

When the synchronous rectification FET 108 is turned OFF, the energy stored in the transformer 105 has charged the secondary electrolytic capacitor 107 and discharging of the energy from the transformer has been ended. Then, the voltage of the terminal Np2 of the primary winding wire NP of the transistor 105 rises, thus the body diode of the synchronous rectification FET 108 may not be turned OFF. Accordingly, the voltage of the terminal Np and the voltage of the terminal Ns start to freely vibrate (period III). During the period III, the primary FET 106 is OFF. Depending on a function of a control integrated circuit (IC) 133 on the primary side of the transformer, the primary FET 106 may be configured to be turned ON in a state that the winding wire voltage of the primary winding wire NP is reduced.

In the switching power source of a pseudo-resonance type described in the present exemplary embodiment, largest current flows through the diode 131 of the secondary side of the transformer immediately after turning-OFF of the primary FET 106. Consequently, great energy loss occurs when time from the start of current flowing through the diode 131 to turning-ON of the synchronous rectification FET 108 is long. According to the present exemplary embodiment, the synchronous rectification FET 108 is quickly turned ON. This enables reduction of energy loss of the diode 131 even when the current of the secondary side of the transformer is largest. Thus, efficiency may be improved to the maximum in the synchronous rectification system.

After the synchronous rectification FET 108 has been turned ON, the current that has flown through the diode 131 flows to the synchronous rectification FET 108. Accordingly, voltages at both ends of the synchronous rectification FET 108 are products of ON-resistance and the current, and become smaller than a forward voltage Vf of the diode 131. FIG. 3 illustrates this status.

Reduced voltages at both ends of the synchronous rectification FET 108 causes reduction of the current flowing through the resistance 115, and accordingly the current flowing through the resistance 109 is reduced to increase the base voltage of the transistor 126. However, since the base voltage of the transistor 126 is lower than that of the transistor 127, the transistor 126 is maintained in the ON-state. The reduced base voltage of the transistor 126 causes reduction of the collector current of the transistor 126. However, the gate voltage is maintained.

The current Is flowing through the secondary side of the transformer is reduced as the energy stored in the transformer 105 is discharged, and set to 0 (A) after the energy stored in the transformer is discharged. The following relationship is established: $Vo \times t = Is \times Ls$ ($Is = n1/n0 \times I1p$), where t is time when the current flowing through the secondary side of the transformer is set to 0 (A), $I1p$ is current flowing immediately before turning-OFF of the primary FET 106, Ls is secondary impedance, and Vo is a voltage of the secondary side.

The current flowing through the secondary winding wire Ns and the synchronous rectification FET 108 is set to 0 (A) with the passage of time t. In the present exemplary embodiment, small ON-resistance is used for the synchronous rectification FET 108, and the current approaches 0 (A). Thus, a very small voltage must be detected. Hereinafter, the detection of a very small voltage in the present exemplary embodiment will be described.

<Feature of Embodiment>

A method based on voltage-current conversion and current-voltage conversion that is a feature of the present exemplary embodiment will be described. A voltage-current conversion circuit according to the present exemplary embodiment is disposed on a side where a pulse voltage from the secondary winding wire NS of the transformer 105 is input into the synchronous rectification FET 108. A current-voltage conversion circuit is disposed on a side from which a DC voltage is output to the synchronous rectification FET 108.

An example where ON-resistance of the synchronous rectification FET 108 is 10 m$\Omega$ and current is 1.0 (A) will be described. When voltages at both ends of the resistance 113 are 1.0 V and forward voltages Vf of the diodes 129 and 130 are 0.6 V, voltages Vbe between the bases and the emitters of the transistor 126 and the transistors 125 and 124 cancel each other, and accordingly, a base potential of the transistor 126 is generated as a base potential of the transistors 124 and 125. Thus, voltages at both ends of the resistances 114 and 115 are respectively set to 0.41 V and 0.040 V. When resistances 114 and 115 are 10 k$\Omega$, current of 41 $\mu$A flows through the resistance 114, and current of 40 $\mu$A flows through the resistance 115. When resistances 109 and 110 are, for example, 80 k$\Omega$, voltages at both ends of the resistance 109 are 3.28 V, voltages at both ends of the resistance 110 are 3.2 V, and a potential difference between the input terminals of the comparator is 80 mV.

Further, when the current Is drops to, for example, 0.125 A, a voltage between the input terminals of the comparator is 10 mV, which is equal to the voltage when it does not pass through the voltage current conversion circuit or the current voltage conversion circuit. This means that a gain is eight times larger in the present exemplary embodiment. A range of current where the synchronous rectification FET 108 is turned OFF is tb in a diagram 306 of FIG. 3. As indicated by the diagram 306 of FIG. 3, a range of current between maximum current Is off 1 and minimum current Is off 2 where the comparator may operate, is narrow. Even when the comparator is turned ON early by a large current, a period where the current flows through the body diode of the synchronous rectification FET 108 is short, and the current is small. Thus, efficiency is not greatly reduced. Even when the comparator is turned ON (slowly) by a small current, a reactive current is small, and efficiency reduction is limited.

Thus, a base ground circuit is disposed on the input terminal side (base terminal of the transistor 126 and base terminal of the transistor 127) of a comparator circuit including the transistors 126 and 127 to enable high-speed response. Further, by the resistance located in the emitter terminal of the transistor 124 and the resistance located in the collector terminal, an amplifier circuit including a voltage-current conversion circuit and a current-voltage conversion circuit is disposed at a stage before a comparator circuit. Thus, a very small potential difference generated in the synchronous rectification FET 108 may be amplified and input into the comparator circuit.

In the circuit according to the present exemplary embodiment, when the base voltage of the transistor 126 becomes higher than that of the transistor 127, the transistor 127 is turned ON while the transistor 126 is turned OFF. Thus, the synchronous rectification FET 108 is turned OFF from the collector terminal of the transistor 127. In other words, the resistance 123 and the base terminal of the transistor 132 are connected to the collector terminal of the transistor 127, and the collector of the transistor 132 is connected to the gate terminal of the synchronous rectification FET 108.

Figure 4:
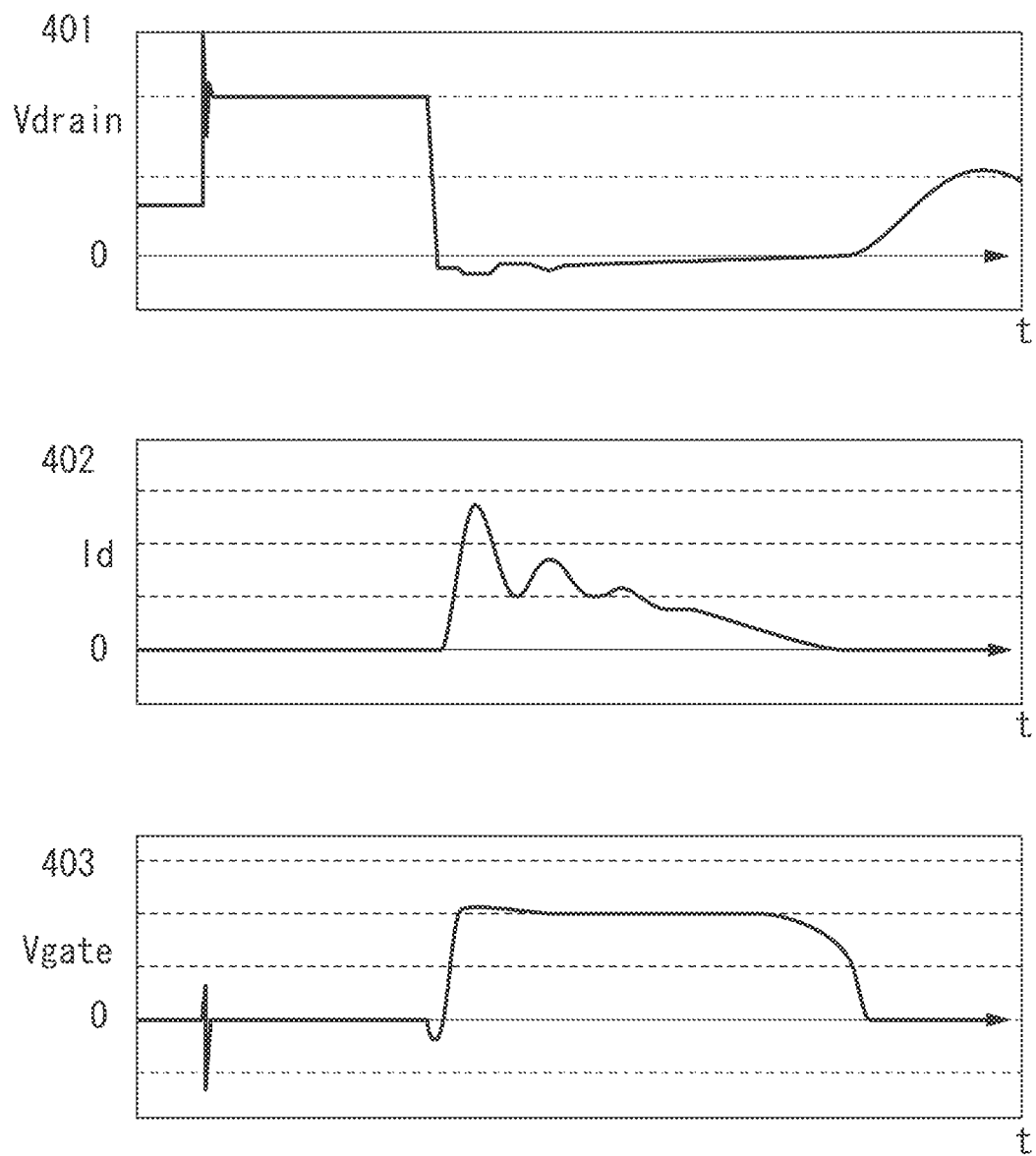
FIG. 4 illustrates an example of a driving waveform of a synchronous rectification FET according to the first exemplary embodiment.

FIG. 4 illustrates an example of an operation waveform of the synchronous rectification FET 108 in the circuit. Specifically, FIG. 4 illustrates a voltage (Vdrain) 401 of the drain terminal of the synchronous rectification FET, drain current (Id) 402 of the synchronous rectification FET, and a gate terminal voltage (Vgate) 403. Thus, the turning ON-OFF of the synchronous rectification FET 108 is carried out.

Variance of a voltage Vbe between the bases and the emitters of the transistors 124 and 118 and the transistors 126 and 120 used in the present exemplary embodiment and a forward voltage Vf of the diodes 120 and 121 greatly affects current detection accuracy. Thus, for the pair of transistors 124 and 118 and the pair of transistors 126 and 120, transistors of high pairing characteristics are used. Similarly, for the diodes 129 and 130, diodes of high pairing characteristics are used.

As described above, according to the present exemplary embodiment, the synchronous rectification FET 108 is directly turned ON by the input transistor 126 of the differential amplifier, and turned OFF by using the output from the input transistor 127 on the opposite side of the differential amplifier. When synchronous rectification is carried out on the secondary side of a fly-back power source, a current during turning-ON is large, and a large base current of the transistor 126 may be acquired. Consequently, the synchronous rectification FET 108 may be fast turned ON. The transistor 126 is driven in a form similar to the emitter ground with the output set as the collector. This form may increase a collector voltage nearly up to a power source voltage, and is particularly suitable for a power source that outputs a low voltage.

Further, the synchronous rectification FET 108 does not need much gate current after it has been turned OFF. Accordingly, no problem occurs even when the collector current of the transistor 126 is lowered. It is also effective because the gate driving circuit does not supply any useless current during the turning-off. In other words, according to the present exemplary embodiment, even when the switching element of small resistance is used, the current 0 (A) may accurately be detected, and ON-timing of the switching element may be set to a high speed. The power source may be surely operated even in a state of the low output voltage (e.g., during standing-by) of the power source, and loss caused by switching may be reduced even in a state of the high output voltage (normal time).

Thus, according to the present exemplary embodiment, in the switching power source based on the synchronous rectification method, the power source may correctly be operated by using the switching element (the synchronous rectification FET) of low ON-resistance without reducing efficiency.

In the present exemplary embodiment, the resistances 119 and 120, which are inserted to stabilize the circuit operation, may be removed when they are unnecessary according to operation conditions. Further, due to an influence of a feedback capacity of the synchronous rectification FET 108, the voltage of the secondary winding wire Ns changes immediately before the turning-ON, and accordingly a negative voltage may appear at the gate. When this negative voltage is a problem, anode and cathode diodes are respectively added to the source and the gate of the synchronous rectification FET 108 to suppress the negative voltage appearing at the gate.

In the present exemplary embodiment, the current-voltage conversion circuit is disposed in each of the drain and source sides of the synchronous rectification FET 108. In practice, however, a current-voltage conversion circuit may be disposed in one of the drain and source sides, and a constant voltage source may be disposed on the other side.

Figure 5:
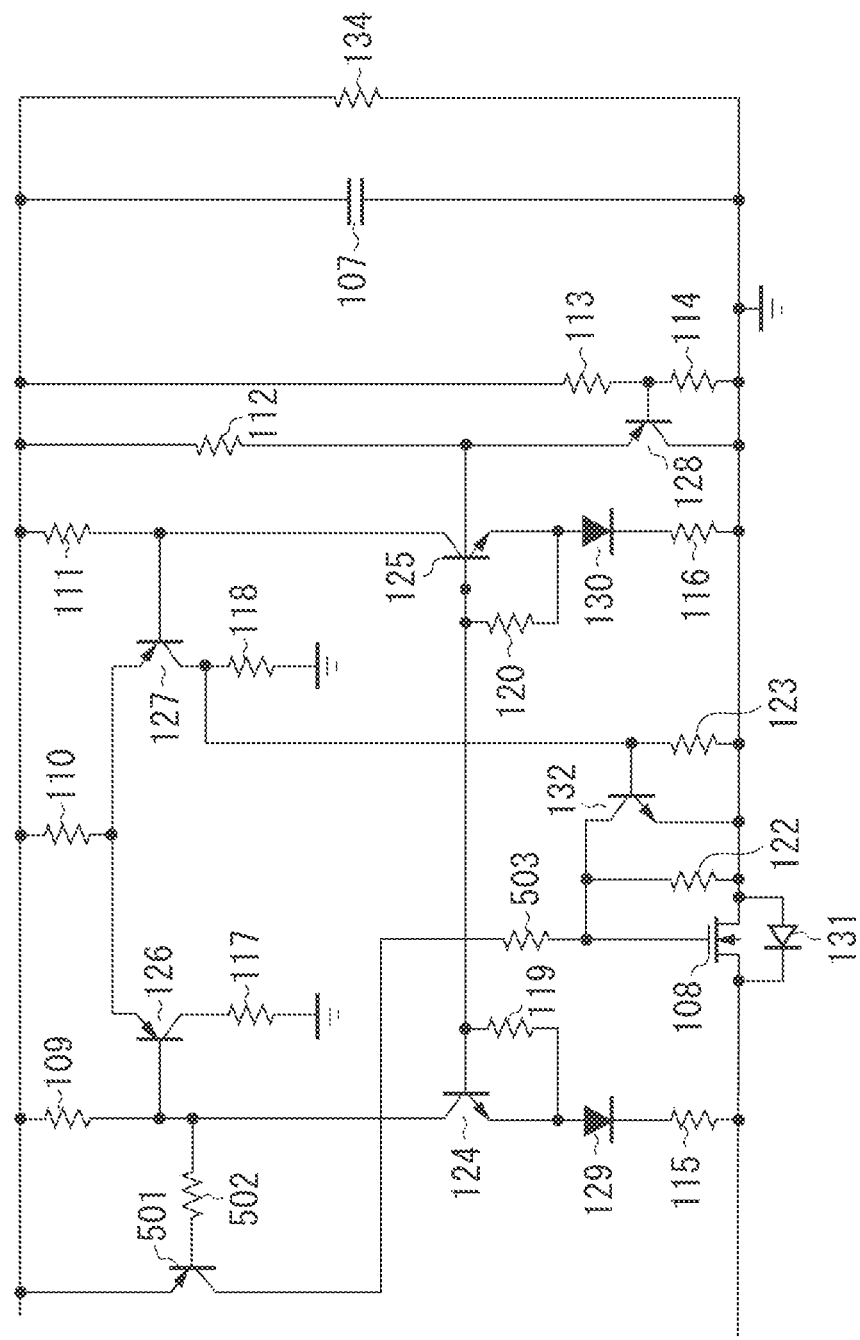
FIG. 5 illustrates a synchronous rectification circuit according to a second exemplary embodiment.

Next, referring to FIG. 5, a synchronous rectification circuit according to a second exemplary embodiment will be described. FIG. 5 is a circuit diagram illustrating a circuit disposed on a secondary side of a transformer 105. The circuit according to the present exemplary embodiment uses a FET having an ON-resistance value lower than that of the synchronous rectification FET 108 of the first exemplary embodiment. When the FET having a lower ON-resistance value is used as the synchronous rectification FET 108, a driving capability of a transistor 126 may be insufficient. In such a case, another transistor may be added to improve the driving capability. Description of portions of the second exemplary embodiment similar to those of the first exemplary embodiment will be omitted.

The circuit illustrated in FIG. 5 includes a PNP transistor 501, and resistances 502 and 503. When current flows in a direction where a diode 131 connected in parallel to the synchronous rectification FET 108 is turned ON to set a drain voltage of the synchronous rectification FET 108 lower than a source voltage by a forward voltage Vf of the diode, a potential difference of a resistance 109 for current voltage conversion becomes larger, and a transistor 501 is turned ON to supply a current to a gate of the synchronous rectification FET 108. As a result, a voltage between the gate and the source of the synchronous rectification FET 108 quickly rises to turn ON the synchronous rectification FET 108. The current, which flows through the diode 131, flows from the source to the drain of the synchronous rectification FET 108.

Since an ON-resistance value of the synchronous rectification FET 108 is very small, namely, about 10 mΩ, the voltage between the drain and the source is set to a value of ON-resistance value×current value, namely, 100 mV or lower. As a result, current flowing through a resistance 115 and the resistance 109 is lowered to reduce voltages at both ends of the resistance 109, and base current of the transistor 501 is also lowered. However, voltages at both ends of the resistance 109 are higher than those at both ends of a resistance 111 until the current nearly drops to 0 A. Accordingly, the synchronous rectification FET 108 is maintained in an ON-state, while a transistor 127 and a transistor 132 are maintained in OFF-states.

Figure 6:
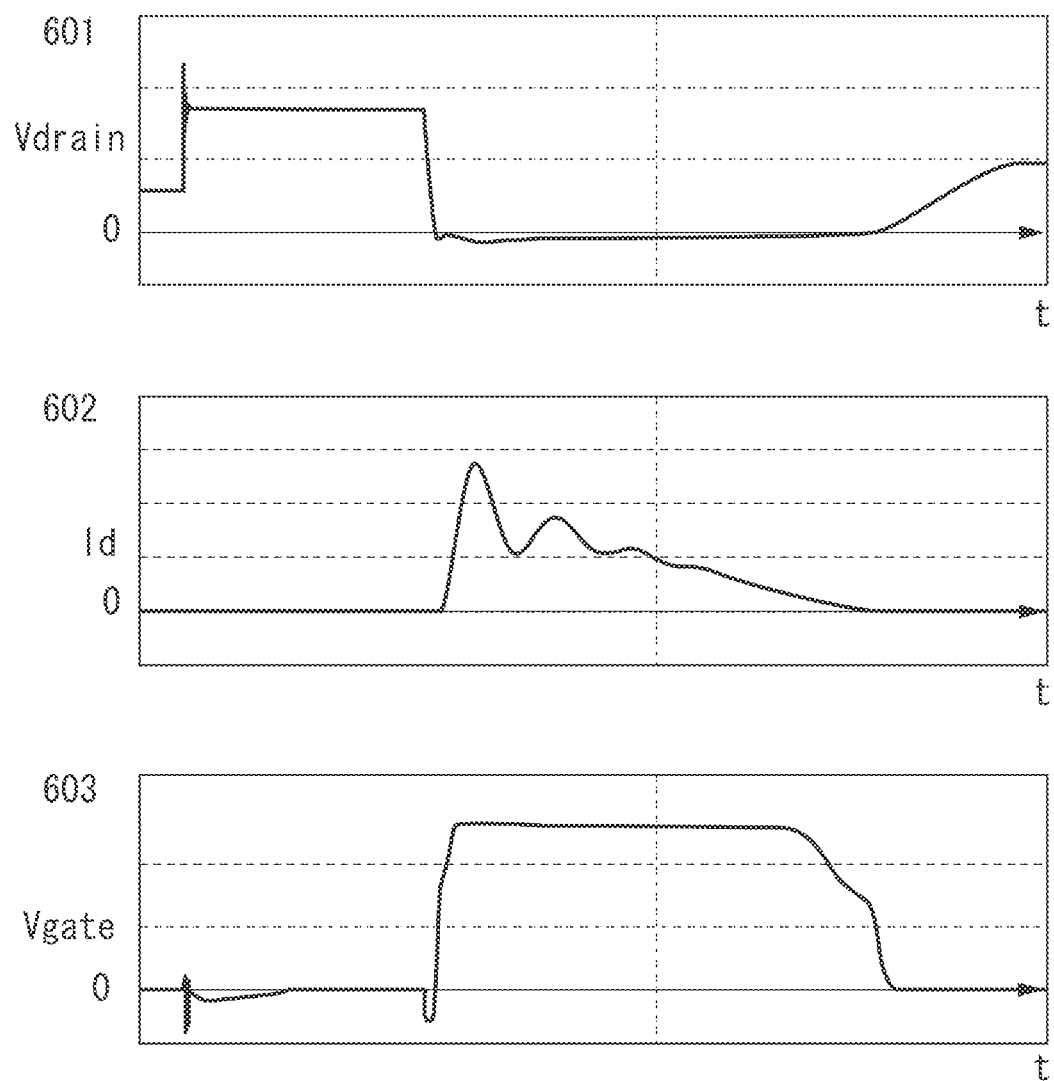
FIG. 6 illustrates an example of a driving waveform of a synchronous rectification FET according to the second exemplary embodiment.

When the current approaches 0 A and the voltage of the resistance 111 becomes higher than that of the resistance 109, the transistor 127 and the transistor 132 are turned ON, while the synchronous rectification FET 108 is turned OFF. In this case, collector current of the transistor 502 is small, and no large current flows even after the transistor 132 has been turned ON. FIG. 6 illustrates its operation waveform.

FIG. 6 illustrates an example of the operation waveform of the synchronous rectification FET 108 in the circuit. Specifically, FIG. 6 illustrates a voltage (Vdrain) 601 of a drain terminal of the synchronous rectification FET, drain current (Id) 602 of the synchronous rectification FET, and a gate terminal voltage (Vgate) 603. Thus, the turning ON-OFF of the synchronous rectification FET 108 is carried out.

In the present exemplary embodiment, as in the case of the first exemplary embodiment, a current-voltage conversion circuit is disposed in the drain side (side to which pulse voltage from secondary winding wire NS is input) of the synchronous rectification FET 108, and a voltage-current conversion circuit is disposed in the source side (side from which DC current is output). However, a current-voltage conversion circuit may be disposed in one of the drain and source sides, and a constant voltage source may be disposed in the other side.

According to the present exemplary embodiment, as in the case of the first exemplary embodiment, even when the switching element of small ON-resistance is used, the current 0 (A) may accurately be detected, and ON-timing of the switching element may be set to a high speed. The power source may surely be operated even in a state of the low output voltage (e.g., during stand-by) of the power source, and loss caused by switching may be reduced even in a state of the high output voltage (normal time). In other words, in the switching power source of the synchronous rectification method, the power source may correctly be operated by using the switching element (the synchronous rectification FET) of low ON-resistance without reducing efficiency.

Next, referring to FIG. 7, a synchronous rectification circuit according to a third exemplary embodiment will be described. The present exemplary embodiment is different from the first and second exemplary embodiments in configuration of a gate driving circuit of a synchronous rectification FET 108. In the present exemplary embodiment, the gate driving circuit of the synchronous rectification FET 108 different from those of the first and second exemplary embodiments will be described. Description of portions similar to those of the first and second exemplary embodiments will be omitted.

Figure 7:
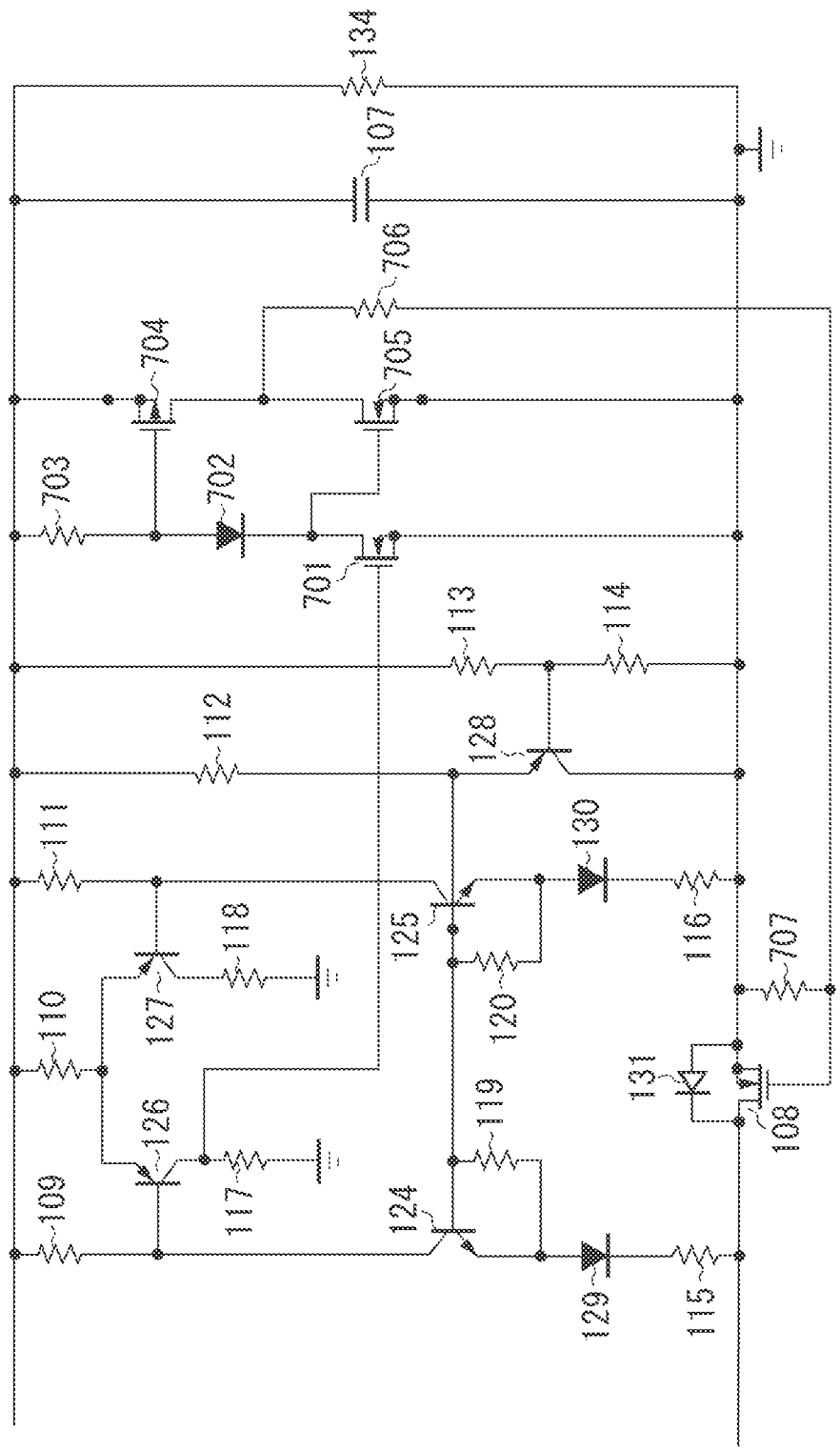
FIG. 7 illustrates a synchronous rectification circuit according to a third exemplary embodiment.

In FIG. 7, the gate driving circuit includes N channel MOSFETs 701 and 705, a P channel MOSFET 704, a diode 702, and resistances 703 and 706. An output of a differential amplifier circuit is input to the N channel MOSFET 701. In this case, the following expressions 1 to 3 are employed, where Vcc is a power source voltage, Vpth is a gate threshold voltage of the P channel MOSFET 704, Vnth is a gate threshold voltage of the N channel MOSFET 705, and Vf is a forward voltage of the diode 131:

$$Vpth+Vf<Vcc \quad (1)$$

$$Vnth+Vf<Vcc \quad (2)$$

$$Vpth+Vf+Vnth>Vcc \quad (3)$$

By selecting the diode 702 which satisfies the three expressions, a rail-to-rail operation from 0V at turn-OFF time to Vc at turn-ON time may be carried out while preventing conduction between the N channel MOSFET and the P channel MOSFET.

The circuit includes one diode for the necessary forward voltage Vf. However, for a simpler configuration, the circuit may be configured by connecting diodes in series or by zener diodes.

Figure 8:
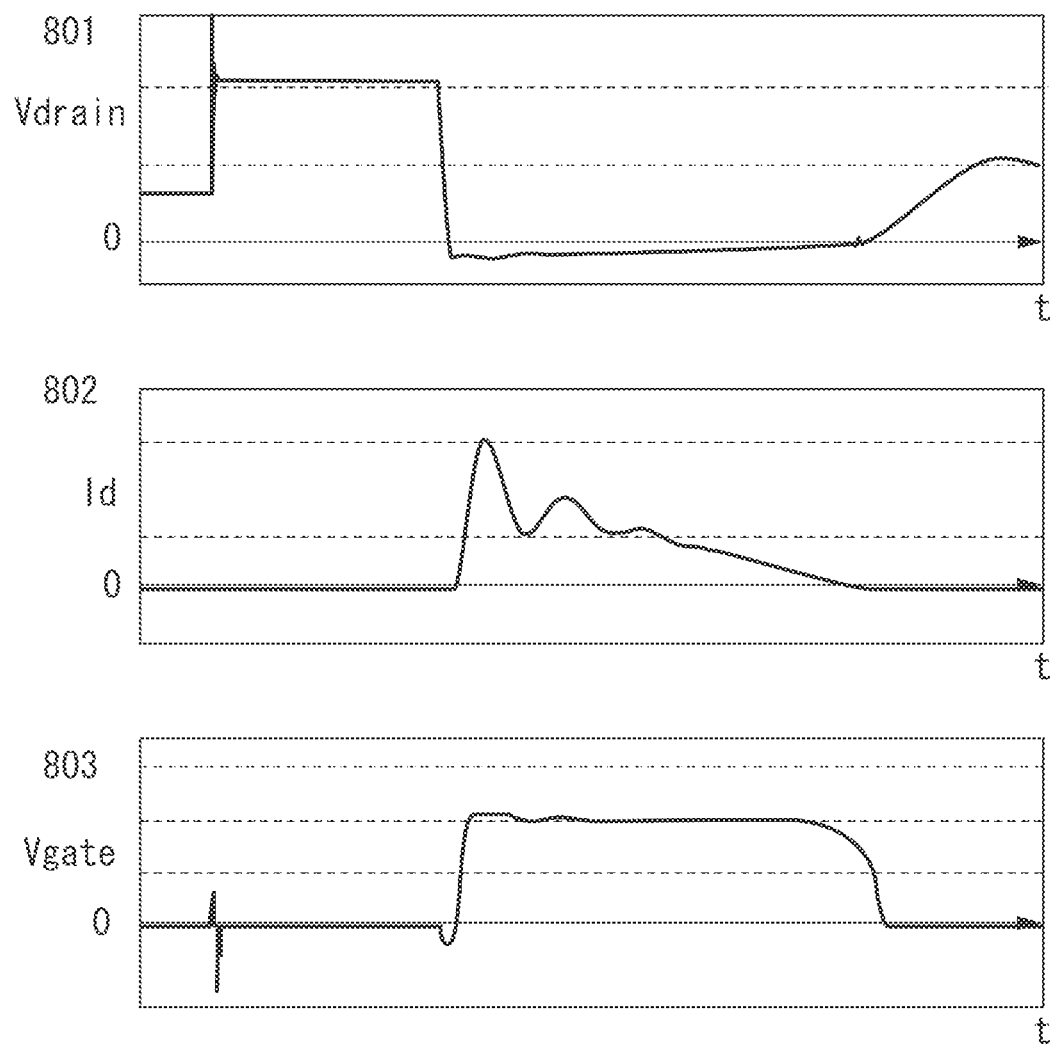
FIG. 8 illustrates an example of a driving waveform of a synchronous rectification FET according to the third exemplary embodiment.

FIG. 8 illustrates an example of an operation waveform of the synchronous rectification FET 108 in the circuit. Specifically, FIG. 8 illustrates a voltage (Vdrain) 801 of a drain terminal of the synchronous rectification FET, drain current (Id) 802 of the synchronous rectification FET, and a gate terminal voltage (Vgate) 803. Thus, the turning ON-OFF operation of the synchronous rectification FET 108 is carried out.

According to the present exemplary embodiment, as in the case of the first exemplary embodiment, even when the switching element of small resistance is used, the current 0 (A) may accurately be detected, and ON-timing of the switching element may be set to a high speed. The power source may be surely operated even in a state of the low output voltage (e.g., during stand-by) of the power source, and loss caused by switching may be reduced even in a state of the high output voltage (normal time). In other words, in the switching power source of the synchronous rectification method, the power source may correctly be operated by using the switching element (the synchronous rectification FET) of low ON-resistance without reducing efficiency.

Next, referring to FIG. 9, a circuit according to a fourth exemplary embodiment will be described. Portions related to the configuration of the third exemplary embodiment will be described. Description of portions similar to those of the first exemplary embodiment will be omitted.

A feature of the fourth exemplary embodiment is a configuration having two converters. As a configuration example, the circuit includes an ACDC converter as a first converter that converts an input AC voltage to output a first DC voltage (24 V), and a DCDC converter as a second converter that outputs a second DC voltage (3.3 V). Then, by using the output voltage of 3.3 V of the second converter, synchronous rectification is carried out on the secondary side of the ACDC converter of 24 V.

Figure 9:
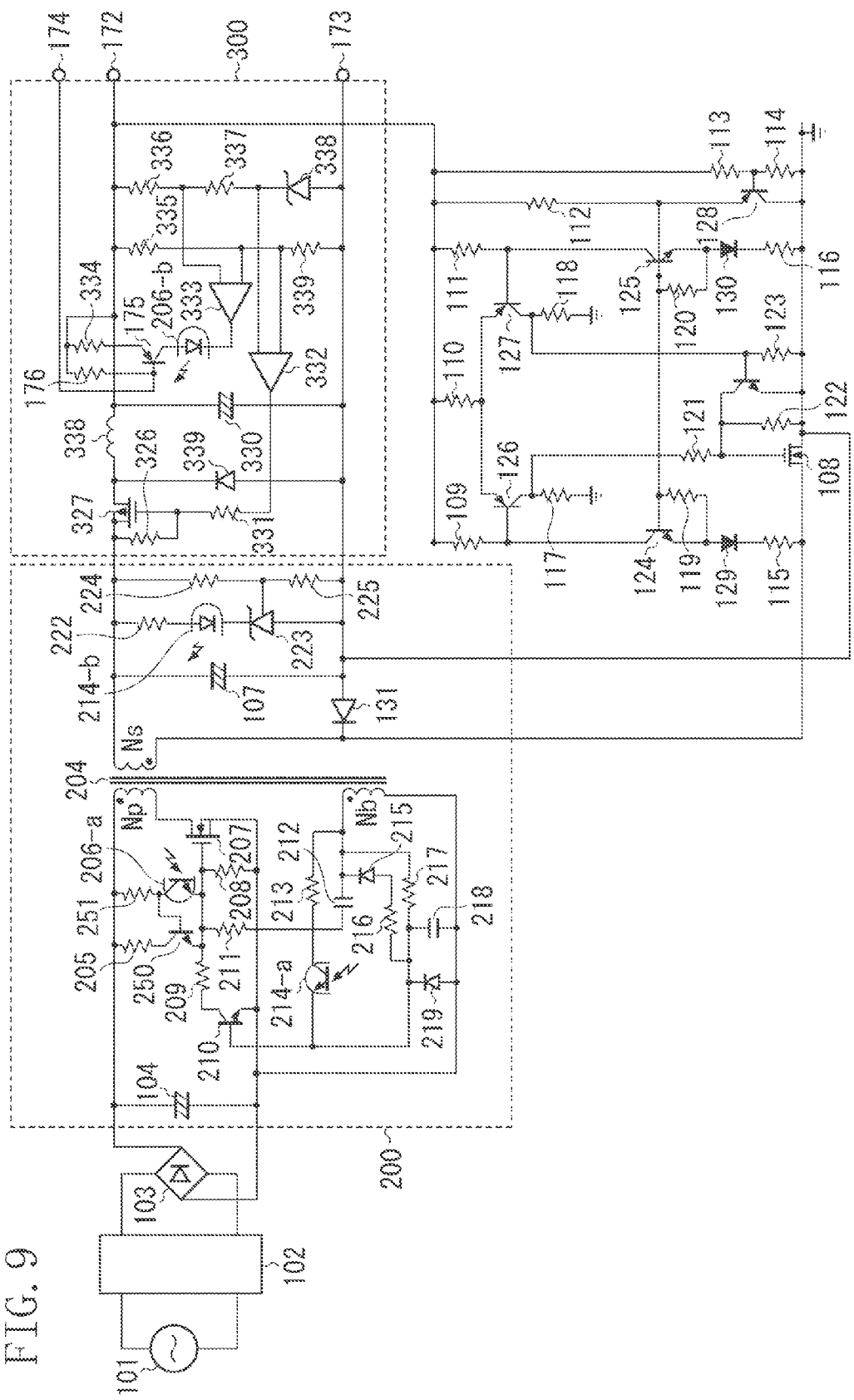
FIG. 9 is a circuit diagram illustrating a switching power source according to a fourth exemplary embodiment.
Figure 10:
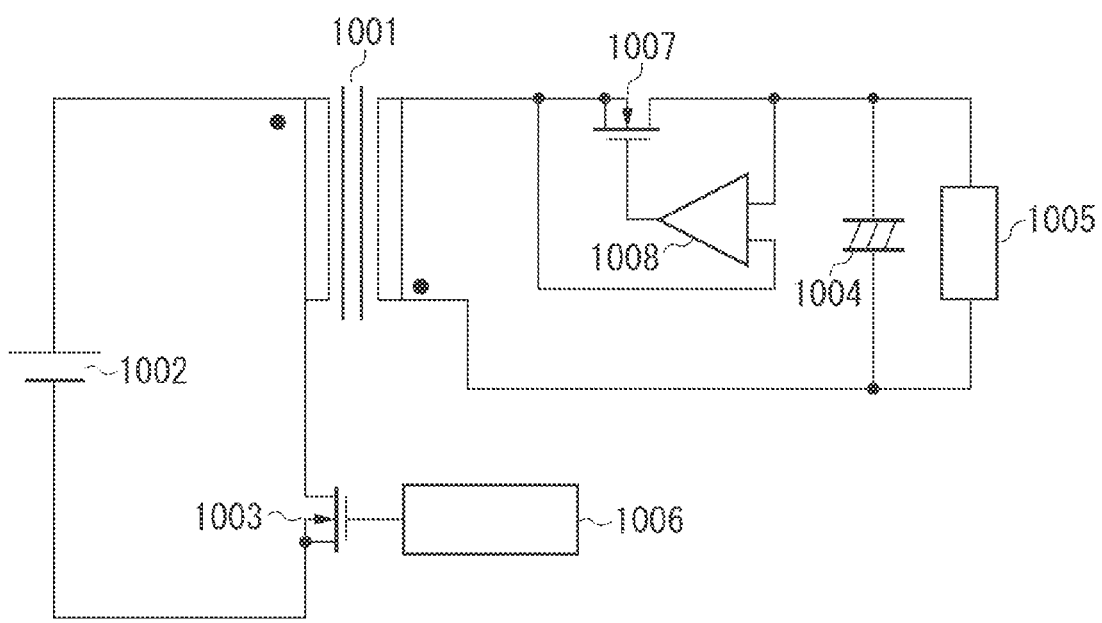
FIG. 10 illustrates a conventional switching element.
Figure 11:
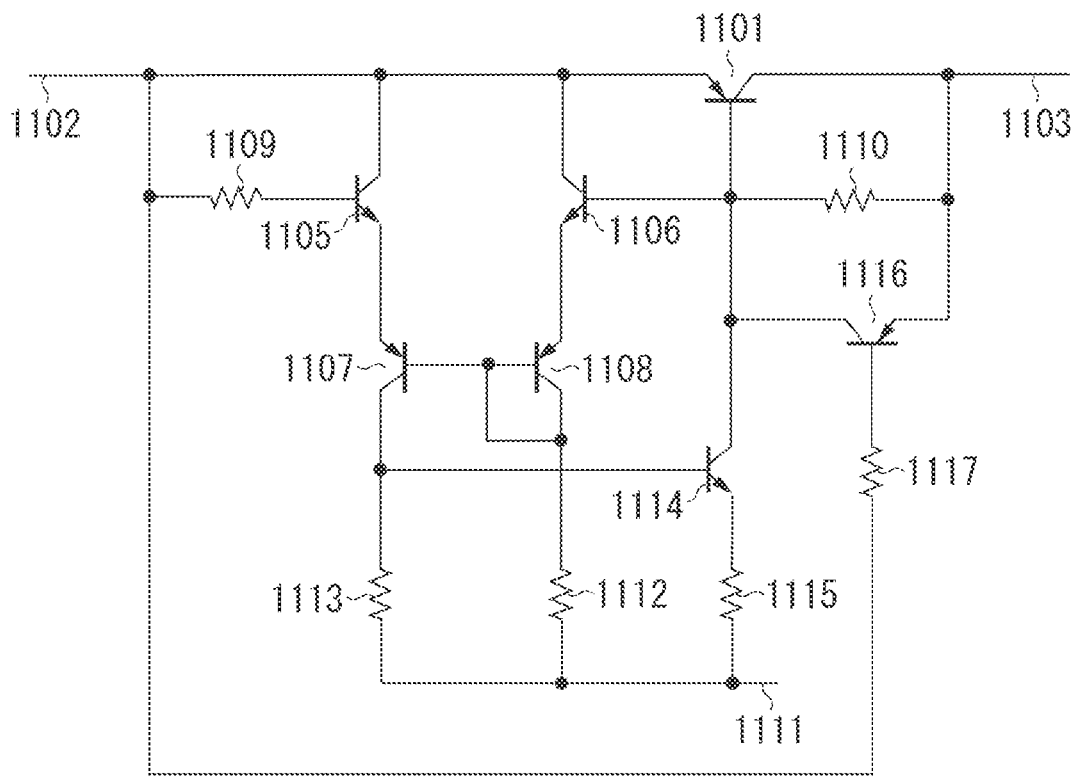
FIG. 11 illustrates an example of a conventional synchronous rectification circuit.
Figure 12:
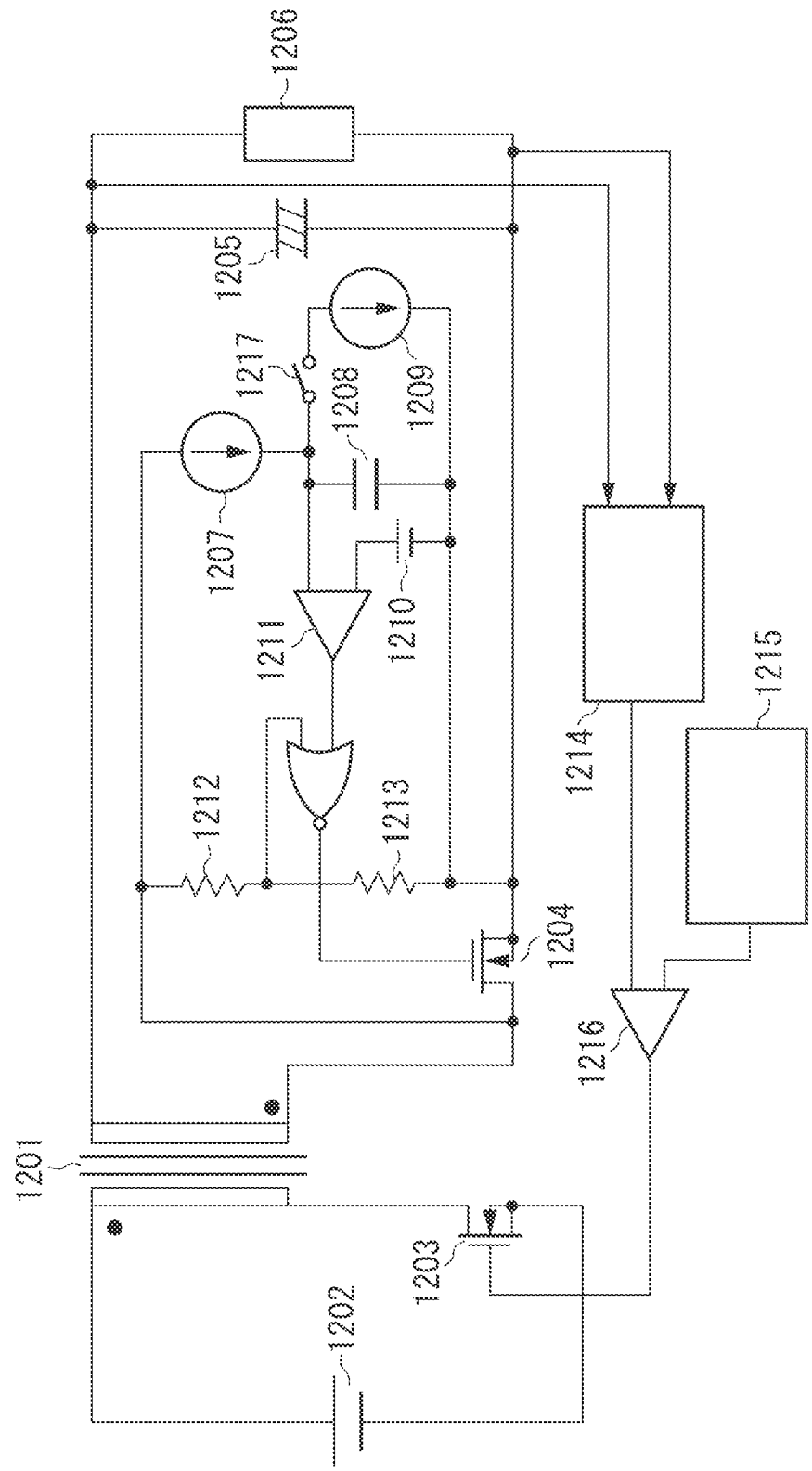
FIG. 12 illustrates an example of a conventional synchronous rectification circuit.

The exemplary circuit illustrated in FIG. 9 includes an ACDC converter 200 and a DCDC converter 300. A synchronous rectification circuit similar to that of the first exemplary embodiment is operated by using the output voltage of the DCDC converter 300 as a power source. The synchronous rectification FET 108 is connected to a secondary side of a transformer in parallel with a diode 131. For the diode 131, a body diode of the synchronous rectification FET 108 or a schottky diode may be used. A RCC method is employed for the ACDC converter 200, and an example where 24 C (DC) is output will be described. In the present exemplary embodiment, the DCDC converter 300 receives 24V (DC), by a voltage-down converter, and outputs 3.3 V.

A voltage input from a commercial AC power source 101 is passed through a filter circuit 102 to be rectified by a diode bridge 103, and smoothed by a primary electrolytic capacitor 104. When power is input, a voltage of the primary electrolytic capacitor 104 gradually increases, and a transistor 250 is turned ON by current from resistance 251. Current flows in from starting resistance 205 to start charging of a capacitor 212 through a resistor 211. When a gate voltage of a FET 207 rises by the current from the starting resistance 205 and exceeds a gate threshold value of the FET 207, the FET 207 is turned ON. As a result, the current flows from the primary electrolytic capacitor 104 through the primary winding wire Np of the transformer 204, and the FET 207.

Since the primary winding wire NP and an auxiliary winding wire Nb of a transformer 204 are the same in winding direction, an output voltage from the auxiliary winding wire Nb increases the gate voltage of the FET 207. Simultaneously, charging of a capacitor 218 is started from a resistance 217. A secondary winding wire Ns of the transformer 204 is connected such that a cathode terminal side of the diode 131 may be higher than a + terminal side of a secondary electrolytic capacitor 107. Accordingly, no current flows through the diode 131 while the FET 207 is ON.

When a voltage of the capacitor 218 rises to increase base and emitter voltages of a transistor 210, thereby turning ON the transistor 210, a voltage between a gate and a source of the FET 207 is lowered to turn OFF the FET 207. Then, the current flows to the auxiliary winding wire Nb through a path of capacitor 218→resistance 216→diode 215 to reset a voltage of the capacitor 218. A diode 219 is a protective diode that executes clamping to prevent enlargement of reverse bias current between a base and an emitter of the transistor 210. Simultaneously, a voltage of the terminal to which the secondary winding wire Ns of the transformer 204 and the cathode of the diode 131 are connected drops equal to or lower than a forward voltage Vf of the diode 131 seen from a − terminal of the secondary electrolytic capacitor 107.

Then, the current flows through the diode 131, and charged current flows through the secondary electrolytic capacitor 107 to start an increase of a voltage of the secondary winding wire Ns. While there is no energy in the transformer 204 and the FET 207 may not be turned ON by a voltage owing to ringing of the auxiliary winding wire Nb, the FET is turned ON by a current from the starting resistance 205 to repeat a series of operations.

When the voltage of the secondary electrolytic capacitor 107 rises as a voltage from the secondary side of the transformer 204, the FET 207 may perform continuous oscillation owing to ringing of the auxiliary winding wire Nb. When the voltage of the secondary electrolytic capacitor 107 rises, a shunt regulator 223 operates to supply a current through a resistance 222 and a photocoupler 214-b, and a phototransistor 214-a is turned ON to quickly turn OFF the FET 207. Thus, the circuit operates to maintain constant voltages at both ends of the secondary electrolytic capacitor 107. The DCDC converter 300 (including output terminals 172 and 173) operates when the output voltage of the ACDC converter is received.

In the present exemplary embodiment, an example where a ripple voltage control converter using a comparator is used will be described. A comparator 332 compares partial voltage values divided by resistances 335 and 339 with an output voltage of a zener diode 338 as a reference voltage. The comparator 332 sets an output as Lo when a voltage of the zener diode 338 is higher than that of the resistance 339. As a result, the FET 327 is turned ON, and the output voltage of the ACDC converter 200 is applied to the zener diode 338. As a result, when a voltage of the capacitor 330 rises, and the voltage of the resistance 339 rises to be higher than that of the zener diode 338, the comparator 332 stops its output. A basic operation as above described is very simple.

When an energy saving instruction signal 174 for setting a light load (sleep state) from the outside is set low, a transistor 175 is turned ON, and an energy saving circuit including a comparator 333 and a photocoupler 206-b is turned ON. The comparator 333 is configured such that an output voltage is lower than a voltage controlled by the comparator 332 using a voltage higher than that of the comparator 332 as a reference value (generated by resistors 336 and 337). When current flows through the photocoupler 206-b, the phototransistor 206-a is turned ON to stop the transistor 250.

Since the resistance 251 has a value ten times higher than the starting resistance 205, a current for charging the capacitor 212 to turn ON the FET 207 is smaller, and time until charging is longer. Thus, by switching the starting resistance 205 of the RCC circuit to the resistance 251, the output voltage may be reduced, and power consumed by the starting resistance 205 may be reduced. Though not illustrated in the present exemplary embodiment, by switching partial voltage resistances 224 and 225 of the shunt regulator 223 to lower the output voltage of the ACDC converter, the operation may be surely stabilized.

By setting the output voltage of the ACDC converter to 24 V, the output voltage of the DCDC converter to 3.3 V, and the ACDC converter to 3.2 V (output smaller than output of DCDC converter), switching loss of the DCDC converter may be prevented (switching ON time is fixed).

The circuit including the components 109 to 130 illustrated in FIG. 9 is a synchronous rectification circuit. For the synchronous rectification circuit, the circuit according to the second exemplary embodiment or the third exemplary embodiment may be applied.

According to the present exemplary embodiment, as in the case of the first exemplary embodiment, even when the switching element of small resistance is used, the current 0 (A) may accurately be detected, and ON-timing of the switching element may be set to a high speed. The power source may surely be operated even in a state of the low output voltage (e.g., during standing-by) of the power source, and loss caused by switching may be reduced even in a state of the high output voltage (normal time). In other words, in the switching power source of the synchronous rectification method, the power source may correctly be operated using the switching element (the synchronous rectification FET) of low ON-resistance without reducing efficiency.

<Application Example of Switching Power Source>

As an example of the switching power source of the exemplary embodiment, there is a low-voltage power source that supplies power to a motor as a device driving unit and a controller (including central processing unit (CPU) and memory) as a control unit. Such a low-voltage power source may be employed, for example, as a low-voltage power source of an image forming apparatus that forms an image in a recording material. Hereinafter, a case where the disclosure is applied as the low-voltage power source to the image forming apparatus will be described.

Figure 13A:
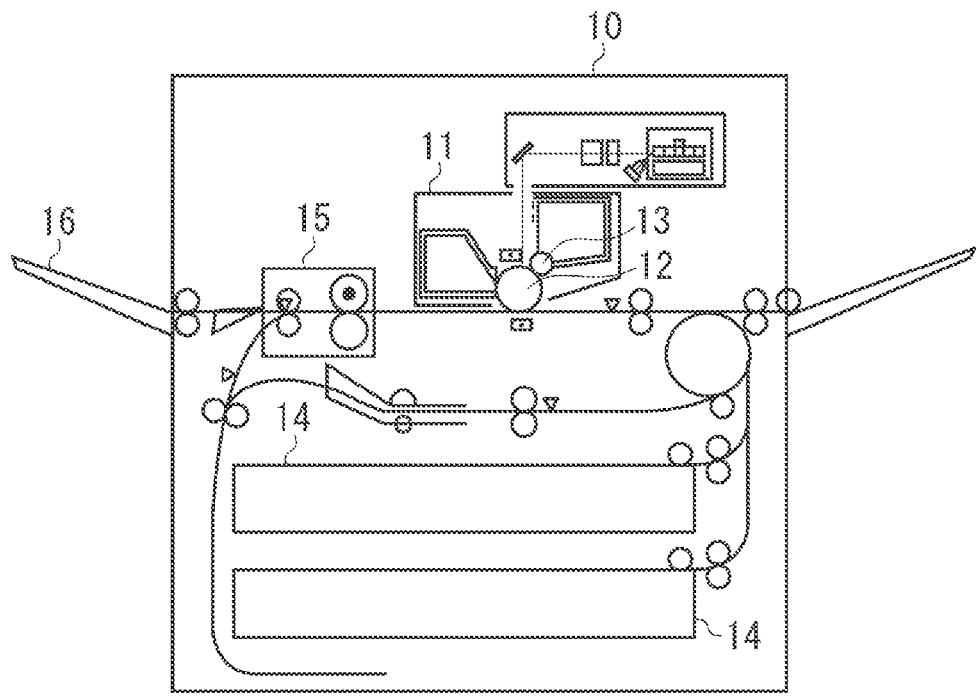
FIGS. 13A and 13B illustrate an example in which a switching power source is provided.

FIG. 13A schematically illustrates a configuration of a laser beam printer as an example of an image forming apparatus. A laser beam printer 10 includes a photosensitive drum 12 as an image bearing member, which is an image forming unit 11 for forming a latent image, and a development unit 13 that develops the latent image formed on the photosensitive drum. A toner image developed on the photosensitive drum 12 is transferred to a sheet (not illustrated) as a recording medium supplied from a cassette 14, and the toner image transferred to the sheet is fixed by a fixing device 15 to be discharged to a tray 16.

Figure 13B:
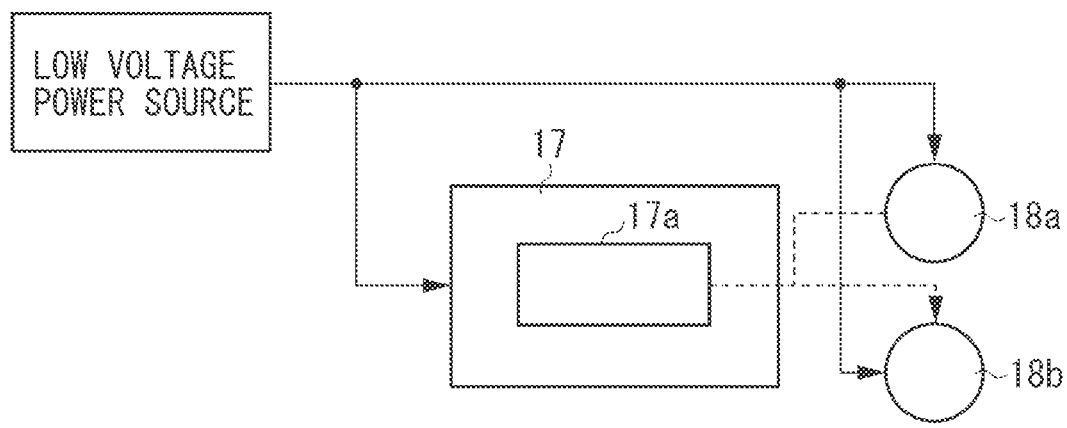

FIG. 13B illustrates a power supply line from a power source to a controller as a control unit of the image forming apparatus and a motor as a driving unit. The current resonance power source may be employed as a low-voltage power source for supplying power to a controller 17 including a CPU 17a for controlling the image forming operation and to a motor 18a and a motor 18b as driving units for forming images. Power of 3.3 V is supplied to the controller 17, and power of 24 V is supplied to the motor. For example, the motor 18a is a motor for driving a conveyance roller for conveying sheets, and the motor 18b is a motor for driving the fixing device 15.

When the power source using the synchronous rectification circuit is employed as such a low-voltage power source of the image forming apparatus, like in the case of the exemplary embodiments, in the switching power source of the synchronous rectification method, the power source may also be correctly operated using the switching element (the synchronous rectification FET) of low ON-resistance without reducing efficiency.

The power sources according to the exemplary embodiments may be employed as power sources for other electronic devices in addition to the image forming apparatus.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-231004 filed Oct. 20, 2011, which is hereby incorporated by reference herein in its entirety.

What is claimed is:

1. A power source device that outputs a DC voltage, comprising:
    a transformer including a primary winding and a secondary winding;
    a switching unit connected to the secondary winding wire, configured to rectify a pulse voltage generated in the secondary winding;
    a first voltage-current conversion unit connected to an input side of the pulse voltage with respect to the switching unit, configured to convert a voltage at an input side of the pulse voltage into a current;
    a first current-voltage conversion unit configured to convert the current converted by the first voltage-current conversion unit into a voltage;
    a second voltage-current conversion unit connected to an output side of the pulse voltage with respect to the switching unit, configured to convert a voltage at an output side of the pulse voltage into a current;
    a second current-voltage conversion unit configured to convert the current converted by the second voltage-current conversion unit into a voltage;
    a comparison unit configured to compare a first voltage from the first current-voltage conversion unit and a second voltage from the second current-voltage conversion unit and turn off the switching unit according to the comparison result; and
    a control unit connected to the first voltage-current conversion unit, configured to turn on the switching unit.

2. The power source device according to claim 1, wherein the comparison unit includes a driving unit configured to turn off the switching unit.

3. The power source device according to claim 1, further comprising:
    a first converter configured to generate a first DC voltage from an AC voltage; and
    a second converter configured to convert the first DC voltage into a second DC voltage which is lower than the first DC voltage,
    wherein the switching unit is disposed on a secondary side of the transformer of the first converter.

4. The power source device according to claim 3, wherein in a light load state of the power source device, the first converter is controlled to output a DC voltage which is lower than the second DC voltage, and ON time of a switching unit in the second converter is controlled to be fixed.

5. The power source device according to claim 1,
wherein the switching unit includes FET, the control unit includes a transistor and a resistor element, and
wherein the transistor is connected to the FET via the resistor element.

6. An image forming apparatus comprising:
an image forming unit configured to form an image on a recording material;
a control unit configured to control an operation of the image forming unit; and
a power source configured to supply a DC voltage to the control unit,
wherein the power source includes:
a transformer including a primary winding and a secondary winding;
a switching unit connected to the secondary winding, configured to rectify a pulse voltage generated in the secondary winding;
a first voltage-current conversion unit connected to an input side of the pulse voltage with respect to the switching unit, configured to convert a voltage at an input side of the pulse voltage into a current;
a first current-voltage conversion unit configured to convert the current converted by the first voltage-current conversion unit into a voltage;
a second voltage-current conversion unit connected to an output side of the pulse voltage with respect to the switching unit, configured to convert a voltage at an output side of the pulse voltage into a current;
a second current-voltage conversion unit configured to convert the current converted by the second voltage-current conversion unit into a voltage;
a comparison unit configured to compare a first voltage from the first current-voltage conversion unit and a second voltage from the second current-voltage conversion unit and turn off the switching unit according to the comparison result; and
a switching control unit connected to the first voltage-current conversion unit, configured to turn on the switching unit.

7. The image forming apparatus according to claim 6, wherein the comparison unit includes a driving unit configured to turn off the switching unit.

8. The image forming apparatus according to claim 6, further comprising:
a first converter configured to generate a first DC voltage from an AC voltage; and
a second converter configured to convert the first DC voltage into a second DC voltage which is lower than the first DC voltage,
wherein the switching unit is disposed on a secondary side of the transformer of the first converter.

9. The image forming apparatus according to claim 8, wherein in a light load state of the power source device, the first converter is controlled to output a DC voltage which is lower than the second DC voltage, and ON time of a switching unit in the second converter is fixed.

10. The power source device according to claim 6,
wherein the switching unit includes FET, the switching control unit includes a transistor and a resistor element, and
wherein the transistor is connected to the FET via the resistor element.

* * * * *